United States Patent
Earnshaw

(10) Patent No.: US 7,200,299 B1
(45) Date of Patent: Apr. 3, 2007

(54) ADDING AND DROPPING WAVELENGTH-CHANNELS

(75) Inventor: Mark Peter Earnshaw, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/387,362

(22) Filed: Mar. 23, 2006

(51) Int. Cl.
*G02B 6/35* (2006.01)
*G02B 6/28* (2006.01)

(52) U.S. Cl. .......................... 385/17; 385/24
(58) Field of Classification Search ............. 385/16–24
See application file for complete search history.

(56) References Cited

U.S. PATENT DOCUMENTS

| | | | |
|---|---|---|---|
| 5,002,350 A | 3/1991 | Dragone | 350/96.15 |
| 5,136,671 A | 8/1992 | Dragone | 385/46 |
| 5,596,661 A | 1/1997 | Henry et al. | 385/24 |
| 6,580,534 B2 | 6/2003 | Madsen | 359/121 |
| 2002/0131678 A1* | 9/2002 | Bentivoglio Ravasui et al. | 385/17 |

OTHER PUBLICATIONS

Datasheet, "Wavelength Division Multiplexing for PacketWave Platform," Luminous Networks, Inc., www.luminous.com, 4 sheets, Oct. 2002.

* cited by examiner

*Primary Examiner*—John D. Lee
(74) *Attorney, Agent, or Firm*—John F. McCabe

(57) ABSTRACT

In a first aspect, an apparatus includes a substrate having a planar surface, an optical demultiplexer located along the surface, and an optical cross-connect matrix located along the surface. The optical demultiplexer has N optical outputs. The optical cross-connect matrix has a first array of N optical input ports and a second array of N optical output ports. Each optical input port of the optical cross-connect matrix is optically connected to a corresponding one of the optical outputs of the optical demultiplexer. The output ports have a sequential ordering in the second array that is a nontrivial permutation of a sequential ordering of the corresponding input ports in the first array.

20 Claims, 11 Drawing Sheets

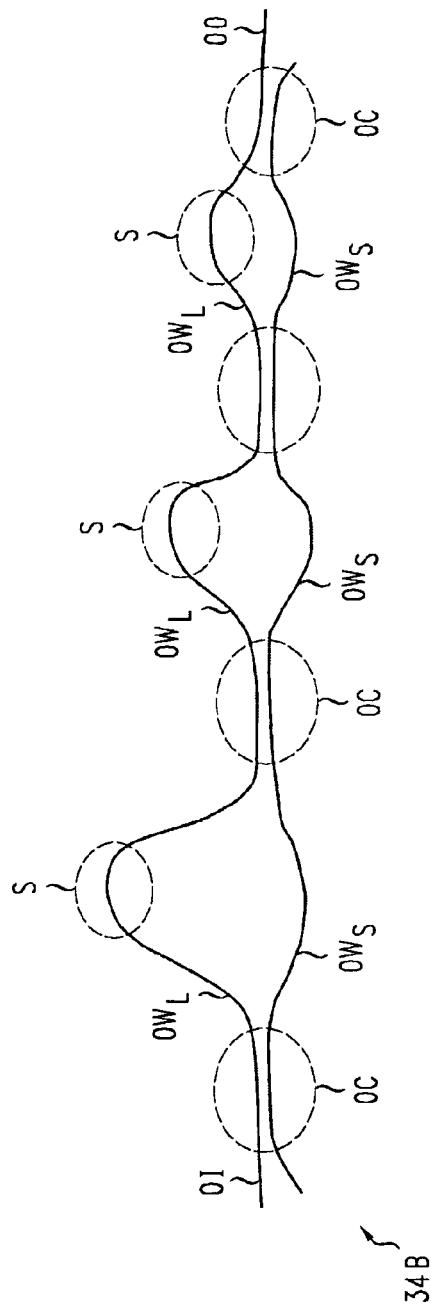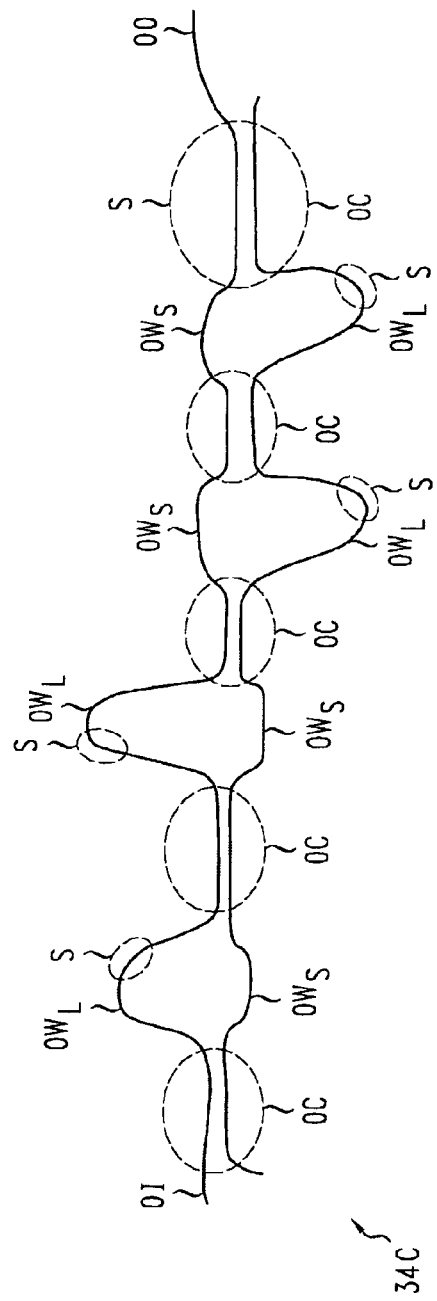

ADDING AND DROPPING WAVELENGTH-CHANNELS

BACKGROUND

1. Field of the Invention

The inventions relate generally to optical communications and, more particularly, to optical communications over multiple wavelength-channels.

2. Discussion of the Related Art

This section introduces aspects that may be helpful to facilitating a better understanding of aspects of the invention. Accordingly, the statements of this section are to be read in this light. The statements of this section are not admissions about the scope of the prior art.

In a dense wavelength division multiplexed (DWDM) system, it is often desirable be able to add or drop any desired wavelength-channel at access points of the DWDM system. An optical component for adding or dropping any wavelength-channel at its optical ports is known as a colorless optical add/drop module.

FIG. 1 shows an exemplary optical add/drop module 10. When functioning to drop one or more wavelength-channels, the optical add/drop module 10 receives optical signals at external optical port 12 and routes the received optical signals towards eight external optical ports $14_1$, $14_2$, $14_3$, $14_4$, $14_5$, $14_6$, $14_7$, $14_8$. When functioning to add one or more wavelength-channels, the optical add/drop module 10 receives optical signals at the eight external optical ports $14_1$, $14_2$, $14_3$, $14_4$, $14_5$, $14_6$, $14_7$, $14_8$ and routes the received optical signals to the external optical port 12.

The optical add/drop module 10 includes an array 18 of seven 1×2 optical intensity splitters $16_1$, $16_2$, $16_3$, $16_4$, $16_5$, $16_6$, $16_7$ and eight tunable optical band pass filters $20_1$, $20_2$, $20_3$, $20_4$, $20_5$, $20_6$, $20_7$, $20_8$. The array 18 has a tree-structure with three layers. In the first layer, an optical input (OI) of the optical intensity splitter $16_1$ connects to the external optical port 12 of the optical add/drop module 10. In the second and third layers, OIs of the layers connect via optical waveguides (OWs) to optical outputs (OOs) of the previous layer. In the third layer, OOs of the optical amplitude splitters $16_4$–$16_7$ connect via OWs to OIs of corresponding tunable optical band pass filters $20_1$–$20_8$. The tunable optical band pass filters $20_1$–$20_8$ have OOs that function as the external optical ports $14_1$–$14_8$ of the optical add/drop module 10.

In the array 18, each 1×2 optical intensity splitter $16_1$–$16_7$ directs about half of the light intensity received at its OI to each of its OOs. In particular, this splitting of received light intensities is performed in non-wavelength selective manner so that light of each wavelength-channel is directed to both OOs of the 1×2 optical intensity splitters $16_1$–$16_7$. For that reason, the array 18 redirects only about an eighth of the received light on any wavelength-channel to the tunable optical band pass filters $20_1$–$20_8$.

Each tunable optical band pass filter $20_1$–$20_8$ has a tunable center band pass wavelength. In particular, the band passes of the individual optical band pass filters $20_1$–$20_8$ may be separately tuned to selectively pass any one of eight preselected adjacent wavelength-channels and to selectively stop the remaining seven of the preselected adjacent wavelength-channels. For that reason, the optical add/drop module 10 is able to function as a colorless optical module for dropping wavelength-channels to the external optical ports $14_1$–$14_8$.

The optical add/drop module 10 is also a colorless add module when the external optical ports $14_1$–$14_8$ function as optical input ports and the external optical port 12 functions as an optical output port.

Unfortunately, the 1×8 optical add/drop module 10 is wasteful with light received at external optical port 12. In particular, the optical add/drop module 10 only delivers about one eighth of such received light of any wavelength-channel to the external optical ports $14_1$–$14_8$. Furthermore, in going from the external optical port 12 to any of the external optical ports $14_1$–$14_8$, light is transmitted through a long chain of optical components. In each such chain, optical losses can further reduce the intensity of the delivered light.

BRIEF SUMMARY

Certain aspects commensurate in scope with the disclosed embodiments are set forth below. It should be understood that these aspects are presented merely as illustrative and that these aspects are not intended to limit the scope of the invention.

Various embodiments provide optical add/drop modules. Some such modules may be more power-efficient and/or simpler to manufacture than optical add/drop modules based on tree-structures of 1×2 optical intensity splitters. In particular, some of the embodiments for optical add/drop modules may pass a larger fraction of the received light intensity on wavelength-channels being dropped. Also, some of the embodiments for optical add/drop modules have less complex optical filters. Finally, some of the embodiments of optical add/drop modules may be easily manufactured as integrated planar optical components.

In a first aspect, an apparatus includes a substrate having a planar surface, an optical demultiplexer located along the surface, and an optical cross-connect matrix located along the surface. The optical demultiplexer has N optical outputs. The optical cross-connect matrix has a first array of N optical input ports and a second array of N optical output ports. Each optical input port of the optical cross-connect matrix is optically connected to a corresponding one of the optical outputs of the optical demultiplexer. The optical output ports have a sequential ordering in the second array that is a nontrivial permutation of the sequential ordering of the corresponding optical input ports in the first array.

In another aspect, an apparatus includes an optical demultiplexer, an optical cross-connect matrix, and an array of optical filters. The optical demultiplexer has an array of optical outputs. The optical cross-connect matrix has a first array of N optical input ports and a second array of N optical output ports. Each optical input port of the optical cross-connect matrix is optically connected to a corresponding one of the optical outputs of the optical demultiplexer. Each optical filter has an optical input connected to a corresponding one of the optical output ports of the optical cross-connect matrix.

In another aspect, a method includes steps for routing optical signals that are received on a plurality of wavelength-channels. The method includes routing the received optical signals from an optical input port to an optical output of a first spatial array of N optical outputs such that each one of the optical outputs of the first spatial array receives those of the optical signals of a group of the wavelength-channels. The group of wavelength channels is in correspondence with the one of the optical outputs. The method includes routing the optical signals from each optical output of the first spatial array to a corresponding optical output of a second spatial array of optical outputs such that correspondences between the groups and the optical outputs in the second spatial array are a nontrivial permutation of the correspondences between the groups and the optical outputs in the first spatial array. The method includes filtering the optical signals received at least one of the optical outputs of the second spatial array to pass optical signals on only a proper subset of the wavelength-channels corresponding to the at least one of the optical outputs.

BRIEF DESCRIPTION OF THE DRAWINGS

Various embodiments are described more fully by the Figures and Detailed Description of Illustrative Embodiments. Nevertheless, the inventions may be embodied in various forms and are not limited to embodiments described in the Figures and/or Detailed Description of Illustrative Embodiments.

FIGS. 4A–4C are block diagrams for Mach-Zehnder interferometers that may be usable as optical filters of the optical add/drop module of FIG. 3;

In the Figures and text, like reference numerals indicate elements with similar functions.

DETAILED DESCRIPTION OF ILLUSTRATIVE EMBODIMENTS

Figure 2:
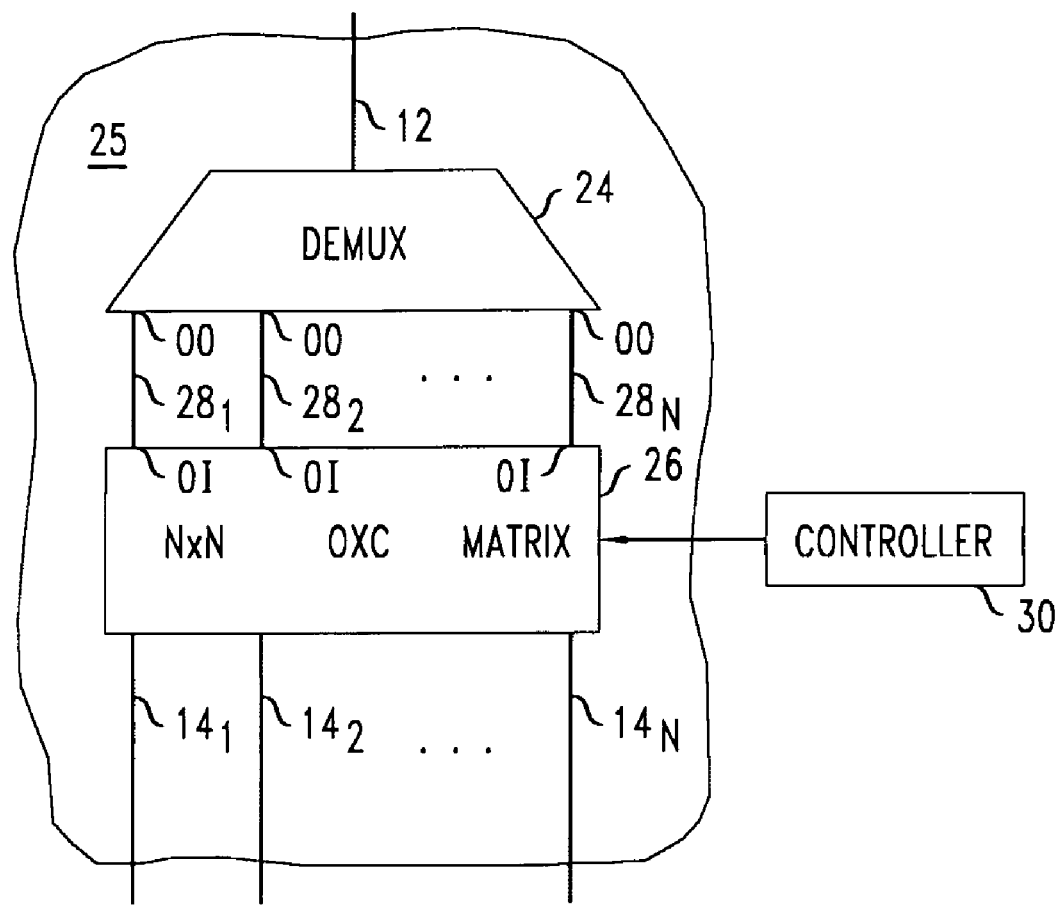
FIG. 2 is a block diagram of one embodiment of an optical add/drop module.

FIG. 2 shows an exemplary optical add/drop module 22 that has an external optical port 12 and an array of N external optical ports $14_1, 14_2, \ldots, 14_N$ where N is three or more and may be eight of more. The optical adds/drop module 22 and external optical ports 12, $14_1$, $14–14_N$ are located along a surface of a planar substrate 25.

The optical add/drop module 22 may operate as an optical add module or an optical drop module. During operation as an optical drop module, the external optical port 12 receives optical signals and the optical add/drop module 22 routes the received optical signals to the external optical ports $14_1–14_N$ in a wavelength-selective manner. During operating as an optical add module, the external optical ports $14_1–14_N$ receive optical signals, and the optical add/drop module 22 routes the received optical signals to external optical port 12. The optical add/drop module 22 can add or drop a variety of wavelength-channels at each optical port $14_1–14_N$ and thus, may function as a quasi-colorless add/drop module.

The optical add/drop module 22 includes an optical demultiplexer (DEMUX) 24, an N×N optical cross-connect (OXC) matrix 26, and a set of N optical waveguides $28_1$, $28_2, \ldots, 28_N$. The optical DEMUX 24, N×N OXC matrix 26 and optical waveguides $28_1–28_N$ are located along the surface of the same substrate 25. Finally, the optical add/drop multiplexer 22 may include an electronic controller 30 that is located on or off the surface of the same substrate 25.

The optical DEMUX 24 routes optical signals between the external optical port 12 to its N optical outputs (OOs) in a wavelength-selective and cyclic manner. That is, the optical DEMUX 24 routes optical signals on the wavelength-channels 1, N+1, 2N+1, 3N+1, etc. to its first OO, routes optical signals on the wavelength-channels 2, N+2, 2N+2, 3N+2, etc. to its second OO, and more generally, routes optical signals on the wavelength-channels k, N+k, 2N+k, 3N+k, etc. to its k-th OO. The preselected set of adjacent wavelength-channels, i.e., 1, 2, 3, etc., have about equal-bandwidth.

An exemplary planar structure for the optical DEMUX 24 may include first and second star couplers and an arrayed waveguide grating (AWG). The first star coupler optically connects the external optical port 12 to one end of the optical waveguides of the AWG. The second star coupler optically connects second ends of the optical waveguides of the AWG to the OOs of the optical DEMUX 24. Such AWG structures for optical DEMUXes and optical multiplexers (MUXes) are well-known to those of skill in the art. For example, U.S. Pat. Nos. 5,002,350 and 5,136,671 describe optical MUXes and optical DEMUXes that may be suitable for apparatus described herein. These U.S. patents are incorporated by reference herein in their entirety.

The optical waveguides $28_1–28_N$ connect the OOs of the optical DEMUX 24 to corresponding optical inputs (OIs) of the N×N OXC matrix. 26.

The N×N OXC matrix 26 includes an array of N optical waveguides that optically connect each of its OIs to a corresponding one of its OOs. The optical waveguides produce substantially wavelength-independent optical connections. These optical connections effectively produce a nontrivial permutation of the spatial sequence formed by the OIs on the substrate 25 into the spatial sequence formed by the OOs on the substrate 25. The permutation causes the k-th external optical port $14_k$ to output wavelength-channels P(k), P(k)+N, P(k)+2N, . . . . Here, P(k) is the value of the N-object permutation on the k-th object.

The N×N OXC matrix 26 may produce fixed or adjustable permutation of the spatial sequence of its OIs into the spatial sequence of its OOs. In the embodiments that produce a fixed permutation, the OXC matrix 26 includes a pattern of crossing optical waveguides that connect its OIs to the corresponding OOs thereby producing the permutation. For embodiments that produce an adjustable permutation, the OXC matrix 26 includes an array of optical waveguides and optical switches that end-to-end connect the optical waveguides to form two-ended optical paths. The two-ended optical paths connect the OIs of the OXC matrix 26 to the corresponding OOs of the OXC matrix 26 thereby producing the permutation. In these embodiments, the states of the optical switches determine the permutation of the spatial sequence of OIs of the N×N OXC matrix 26 into the spatial sequence of OOs of the N×N OXC matrix 26. The states of the optical switches are changed to change the permutation of the OIs into the OOs.

In the N×N OXC matrix 26, the optical switches may be, e.g., thermal optical switches or electro-optical switches. The electronic controller 30 applies the control signals that operate the optical switches of the N×N OXC matrix 26. The electronic controller 30 applies thermal control signals via heaters in embodiments based on thermal-optic switches and applies voltage control signals via electrode pairs in embodiments based on electro-optical switches.

Figure 3:
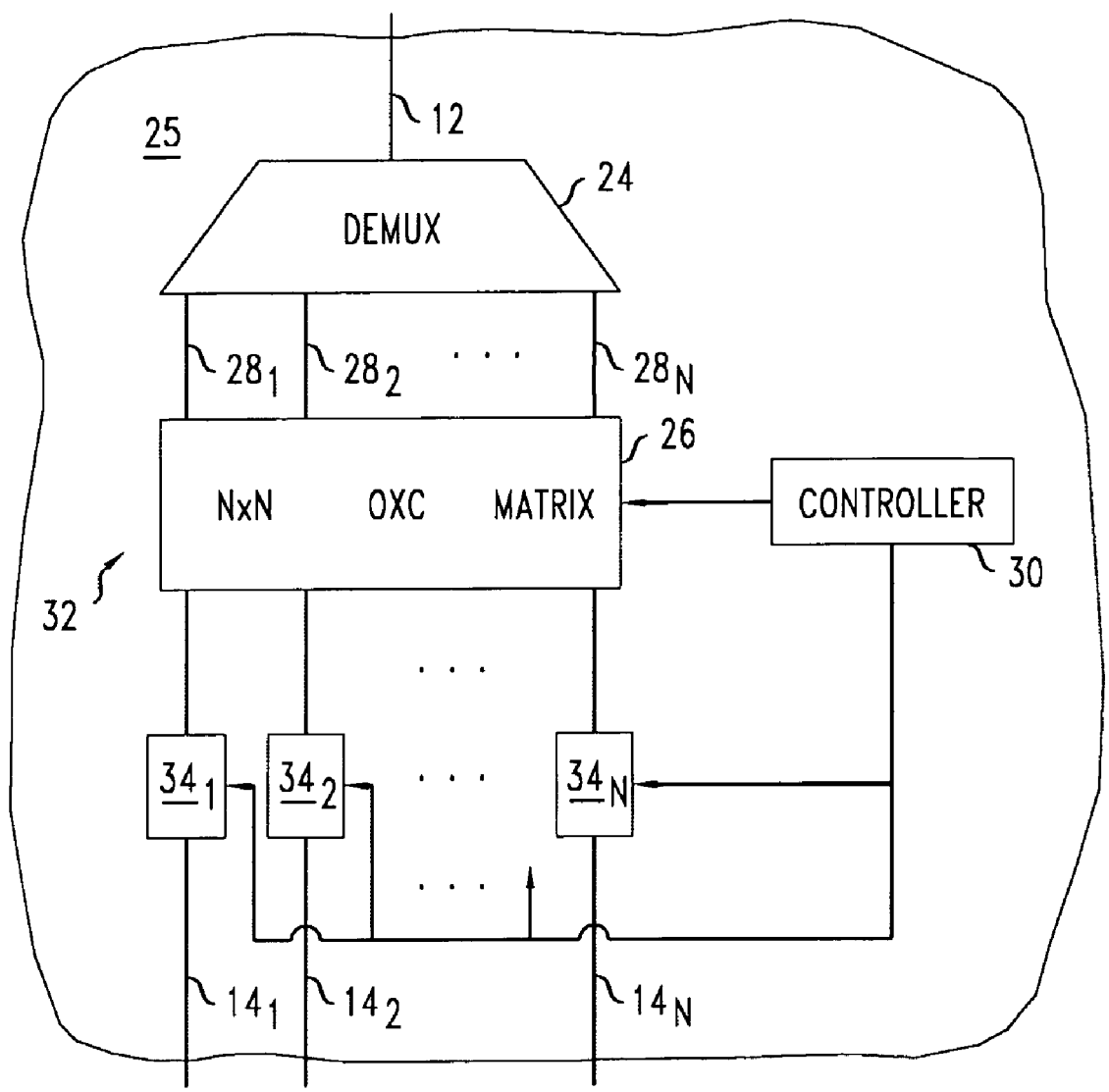
FIG. 3 is a block diagram of another embodiment of an optical add/drop module.

The optical add/drop module may be used to drop a number, M, of adjacent wavelength-channels, wherein M is less than, equal to, or greater than the number N of OOs of the optical DEMUX 24. If $M \leq N$, each external optical port $14_1$–$14_N$ receives optical signals from one or no wavelength-channel. If $M \geq N$, some or all of the external optical ports $14_1$–$14_N$ receive optical signals from multiple wavelength-channels. In the later case, it may be desirable to modify the optical add/drop module 22 so that only one wavelength-channel is dropped at each external optical port $14_1$–$14_N$. FIG. 3 provides an example of such a modified optical add/drop module 32.

Referring to FIG. 3, the modified optical add/drop module 32 includes the optical DEMUX 24, the N×N OXC matrix 26, and the optical waveguides $28_1$–$28_N$ as already described in FIG. 2.

The modified optical add/drop module 32 also includes optical filters $34_1$, $34_2$, ..., $34_N$ and optical waveguides $36_1$, $36_2$, ..., $36_N$ that connect the optical filters $34_1$–$34_N$ to corresponding OOs of the N×N OXC matrix 26. Each of the optical filters $34_1$–$34_N$ is configured to block one or more of the selected wavelength-channels output thereto by the corresponding OO of the N×N OXC matrix 26. In some embodiments, each optical filter $34_1$–$34_N$ may pass only one of the wavelength-channels output thereto by the corresponding OO of the N×N OXC matrix 26. For example, if the corresponding OO of the N×N OXC matrix 26 outputs the wavelength-channels p, p+N, p+2N, and p+3N, the optical filter 36P may pass only wavelength-channel "p". The optical filters $34_1$–$34_N$ may be tunable so that the selections of passed and blocked wavelength-channels may be varied as desired.

In some other embodiments (not shown), only some of the OOs of the OXC matrix 26 connect to an optical filer $34_k$ as shown in FIG. 3. In those embodiments, the remaining OOs of the OXC matrix 26 transmit optical signals on all received wavelength-channels to the corresponding external optical ports $14_q$.

Figure 1:
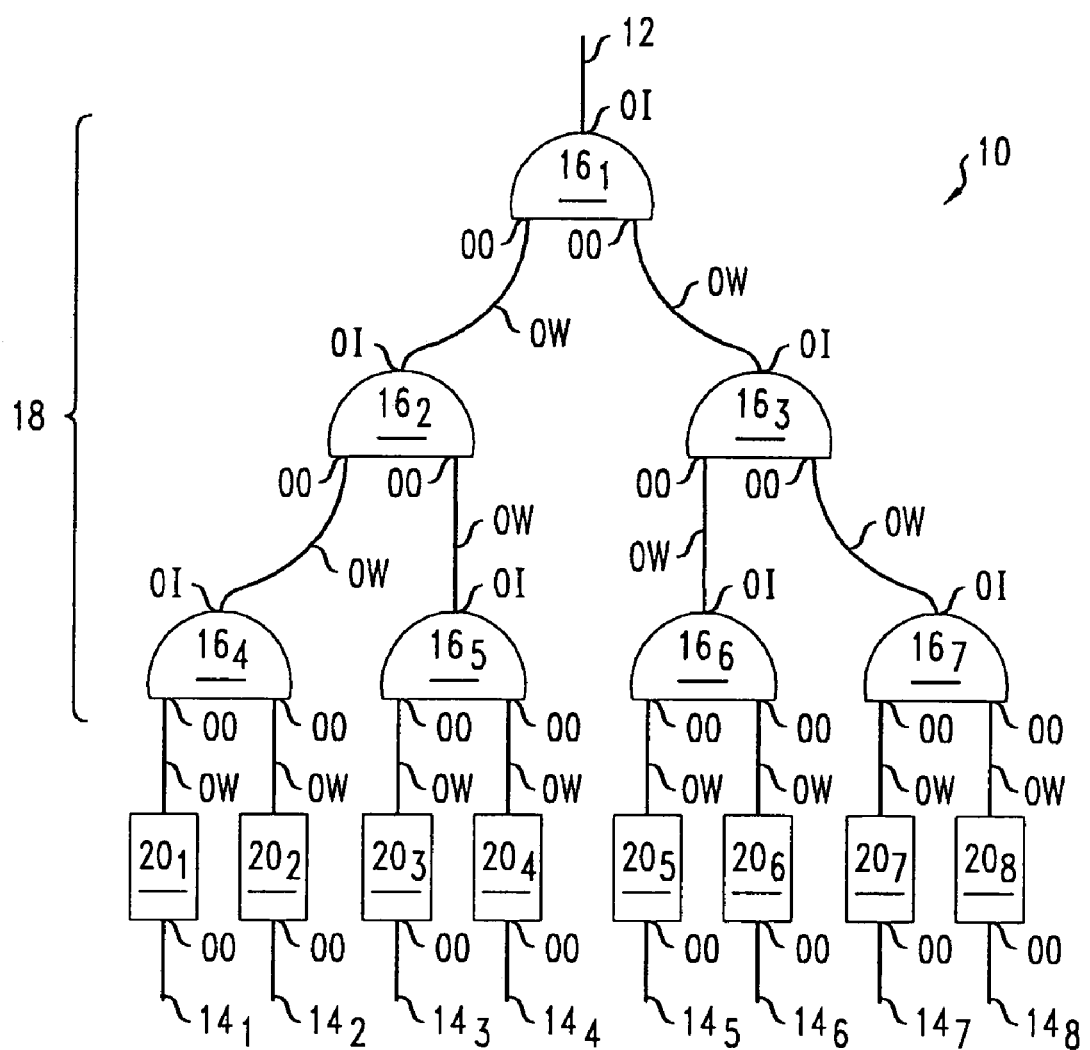
FIG. 1 is a block diagram illustrating a colorless 1×8 optical add/drop module.

Some embodiments of the optical add/drop modules 22, 32 of FIGS. 2 and 3 may have advantages over the add/drop module 10 of FIG. 1. First, since these optical add/drop modules 22, 32 do not have optical intensity splitters, they are able to route a larger percentage of light on the desired wavelength-channels between the external optical port 12 and the external optical ports $14_1$–$14_N$. Second, the optical add/drop module 32 may have less complex optical filters $34_1$–$34_N$ than the optical add/drop module 10. In particular, the optical filters $34_1$–$34_N$ can have wider channel pass regions than the optical band pass filters $20_1$–$20_8$, because the optical filters $34_1$–$34_N$ typically must block wavelength-channels that are more widely spaced from the desired wavelength-channels. For that same reason, the optical add/drop module 32 may be less complex, cheaper to construct, and/or more easily integrated on a single planar substrate than embodiments of the optical add/drop module 10 that have the same external optical port configurations.

A variety of planar designs are available for the optical filters $34_1$–$34_N$ of FIG. 3. The planar designs are adapted to block one or more of the wavelength-channels that output to the individual optical filters $34_1$–$34_N$ by the N×N OXC matrix 26. In the various embodiments, the optical filters $34_1$–$34_N$ may have notch transmission characteristics, band pass transmission characteristics, or transmission characteristics that combine both behaviors. Several planar designs for optical filters $34_1$–$34_N$ or component optical filters thereof are shown in FIGS. 4A–4E. Useful planar designs for some such optical filters may be described, e.g., in U.S. Pat. Nos. 5,596,661 and 6,580,534. Both of these U.S. Patents are incorporated by reference herein in their entirety.

Figure 4A:
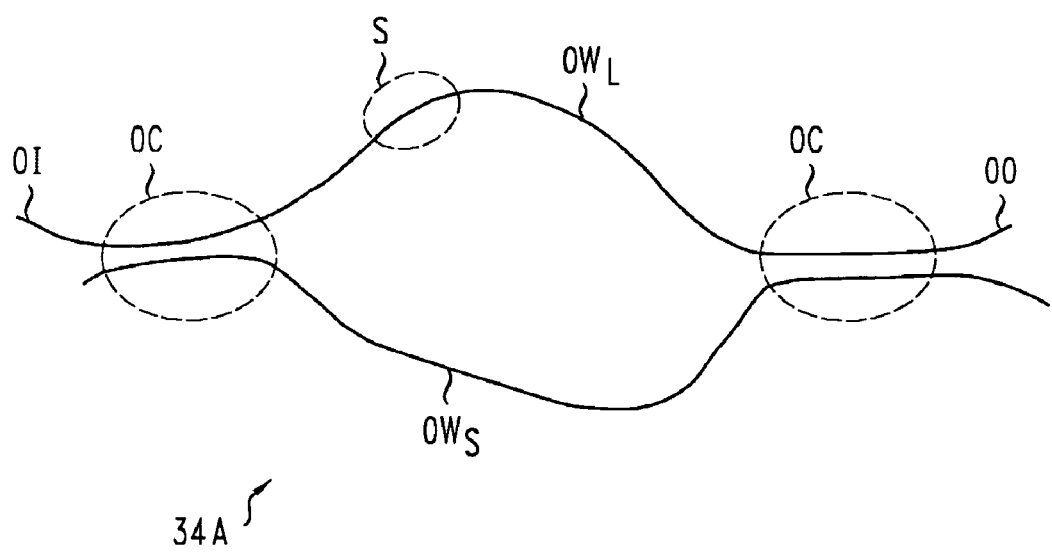

FIGS. 4A–4C illustrate Mach-Zehnder interferometers 34A, 34B, 34C that may function as optical filters with band pass and/or notch spectral transmission characteristics. The Mach-Zehnder interferometers 34A, 34B, and 34C have one, three, and four stages, respectively. Each stage includes a pair of optical waveguides i.e., a relatively longer optical waveguide $OW_L$ and a relatively shorter optical waveguide $OW_S$. The pairs of optical waveguides $OW_L$, $OW_S$ in adjacent stages serially couple via 2×2 optical couplers (OCs). The 2×2 optical couplers bring the paired optical waveguides $OW_L$, $OW_S$ close together in a coupling region that is located between the adjacent stages. This configuration produces both a direct coupling between the paired optical waveguides $OW_L$, $OW_S$ of the adjacent stages and a crossed coupling between the paired optical waveguides $OW_L$, $OW_S$ of the adjacent stages. The relative strengths of the direct and crossed couplings are determined by the length of the coupling region, refractive indexes in the coupling region, and the separation of the paired optical waveguides in coupling region. The paired optical waveguides $OW_L$, $OW_S$ of the first stage connect to the optical outputs of an optical intensity splitter or a 2×2 optical coupler, OC, that determines their coupling strengths to the OO of the optical filter. The paired optical waveguides $OW_L$, $OW_S$ of the last stage connect to OIs of an optical intensity combiner or a 2×2 optical coupler, OC, that determines their coupling strengths to the OO of the optical filter.

In the Mach-Zehnder interferometers 34A–34C, the relative phase differences that the paired optical waveguides $OW_L$, $OW_S$ of each stage produce between light propagating there through and the strengths of direct and crossed couplings in the 2×2 optical couplers, optical splitter and/or optical combiner, i.e., the OCs, substantially define the spectral transmission characteristics of the optical filters.

Referring to FIG. 4A, the single stage Mach-Zehnder interferometer 34A may be configured as an optical notch filter if the optical couplers produce equal strength direct and crossed couplings, and the optical waveguides $OW_L$, $OW_S$ produce a relative phase difference of $\pi$ between light signals propagating there through. The single stage Mach-Zehnder interferometer 34A can be configured to substantially block optical signals on a wavelength-channel that the Mach-Zehnder interferometer 34A receives from the corresponding OO of the N×N OXC matrix 26 of FIG. 3.

Referring to FIGS. 4B and 4C, the three and four stage Mach-Zehnder interferometers 34b, 34C have spectral transmission characteristics described by finite Fourier series, e.g., finite odd harmonic series. To obtain such spectral transmission characteristics, the optical waveguides $OW_L$, $OW_S$ of each stage should typically be constrained to generate special relative phase differences between the light propagating there through. In particular, ratios of the relative phase differences produced by the individual stages over to the relative phase difference produced by the stage that produces the smallest such relative phase difference should form a sequence of special values. For example, the sequence of special values may be 1, about 2, and about 4 in the three stage Mach-Zehnder interferometer 34B. Also, the sequence of these special values may be 1, about 2, about −2, and about −2 in the four-stage Mach-Zehnder interferometer 34C. The three and four stage Mach-Zehnder interferometers 34B, 34C whose stages satisfy the above constraints and whose 2×2 optical couplers, optical splitter and/or optical combiner generate suitable direct and crossed optical couplings can have wider spectral notch regions than the one-stage Mach-Zehnder interferometer 34A. In light of the description herein, suitable values of the direct and crossed optical couplings for the 2×2 optical couplers, optical splitter and/or optical combiner of the Mach-Zehnder interferometers 34B, 34C would also be easily determined by those of skill in the art and may be described, e.g., in U.S. Pat. No. 5,596,661.

In some embodiments, the optical filters optical $34_1$–$34_N$ of FIG. 3 are wavelength-tunable.

In such embodiments, the electronic controller 30 may also generate electrical signals that control the selection of the wavelength-channels passed by the optical filters $34_1$–$34_N$. The electrical control signals either operate heaters that heat thermally active segments (Ss) of the optical waveguides $OW_L$, $OW_S$ or operate paired electrodes that apply voltages across electro-optically active segments (Ss) of the optical waveguides $OW_L$, $OW_S$ as shown in FIGS. 4A–4C. The active segments, S, have refractive indexes that respond to temperature or electric field values therein. The resulting refractive index changes vary the relative phase differences that the paired optical waveguides $OW_L$, $OW_S$ produce on light propagating there through.

In such embodiments, the electronic controller 30 may generate other electrical signals to control heaters or paired electrodes that regulate the temperature or electric field in the 2×2 optical couplers, optical splitter and/or optical combiner, i.e., the OCs, of the Mach-Zehnder interferometers 34B, 34C of FIGS. 4B–4C. In particular, refractive indexes and refractive index contrasts fix the coupling between the closely spaced optical waveguide pairs in coupling regions of 2×2 optical couplers, optical splitters and/or optical combiners, i.e., the OCs. By controlling the application of heat to thermo-optically active portions of those coupling regions or the application of voltages across electro-optically active portions of those coupling regions, the electronic controller 30 may change relative strengths of the direct and crossed optical couplings between adjacent stages of the Mach-Zehnder interferometers 34B, 34C.

Some embodiments may configure the optical waveguides and couplers of the Mach-Zehnder interferometers 34A, 34B, 34C to respond to the above types of electrical control signals from the electronic controller 30. Such control signals can control wavelength ranges of band passes and/or band notches in the Mach-Zehnder interferometers 34A, 34B, 34C of FIGS. 4A–4C. In light of the above-description, one of skill in the art would be able to implement wavelength-tunability in the Mach-Zehnder interferometers 34A, 34B, 34C without undue experimentation.

Figure 4D:
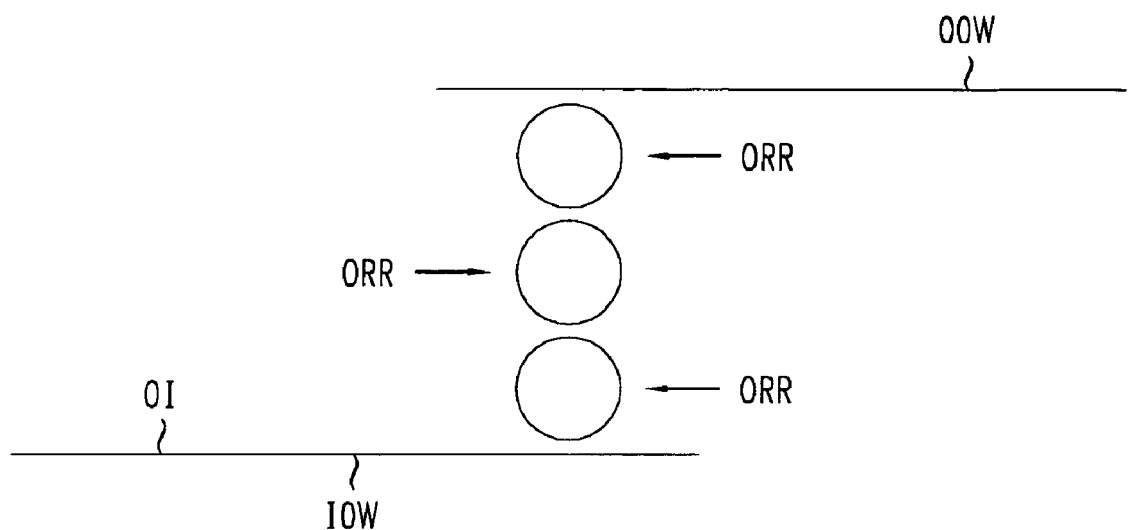
FIG. 4D is a block diagram for an optical ring resonator device that may be usable in the optical filters of the optical add/drop module of FIG. 3.
Figure 4E:
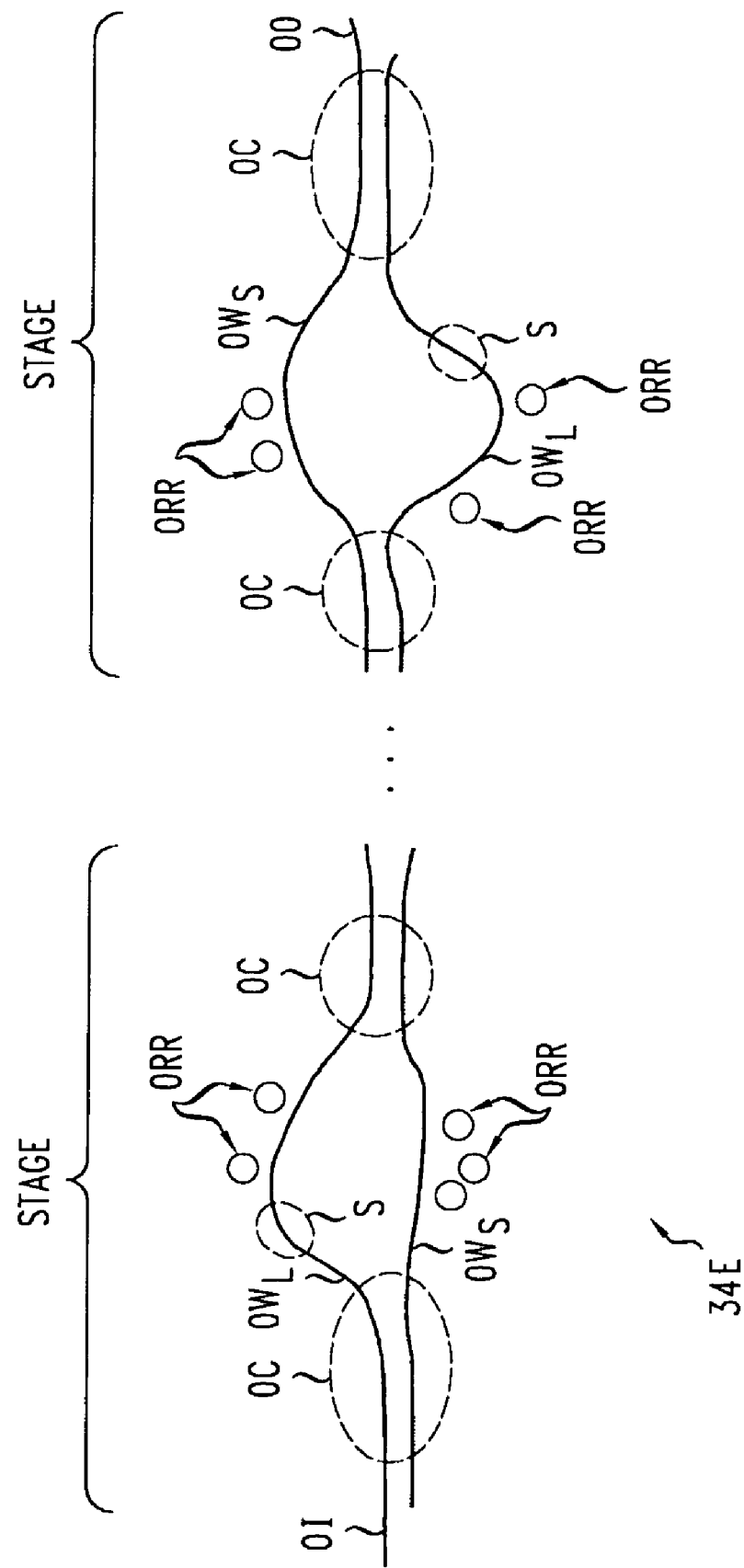
FIG. 4E is a block diagram for hybrid Mach-Zehnder interferometer that includes optical ring resonators and may be usable in the optical filters of the optical add/drop module of FIG. 3.

The optical filters $34_1$–$34_N$ of FIG. 3 may include optical ring resonators (ORRs) as illustrated in optical filters 34D, 34E shown in FIGS. 4D and 4E.

Referring to FIG. 4D, the optical filter 34D includes an input optical waveguide (IOW), an output optical waveguide (OOW), and a sequence of coupled optical ring resonators. The sequence of coupled optical ring resonators forms an optical coupler between the input and output optical waveguides IOW, OOW. In the sequence, the various optical ring resonators have close but different resonant wavelengths, i.e., their resonant wavelengths are verniered. Such a configuration of the resonant wavelengths can cause resonant wavelengths of the sequence to be more widely spaced than those of the individual optical ring resonators. Due to the wider spacing of these resonant wavelengths, the sequence of optical ring resonators may be configured to have wider band notch regions than an optical device in which input and output optical waveguides are coupled by a single optical ring resonator (not shown). The wider band notches can block more of the wavelength-channels outputted by the N×N OXC matrix 26 to the individual optical filters $34_1$–$34_N$ of FIG. 3 thereby improving wavelength-selectivity.

While the illustrated optical band pass filter 34D includes a sequence of three optical ring resonators, other embodiments of such filters may have one, two, three, or more of the optical ring resonators in the sequence that couples the input and output optical waveguides IOW, OOW.

Referring to FIG. 4E, the optical filter 34E includes a hybrid Mach-Zehnder interferometer having multiple stages. Each stage includes a pair of optical waveguides $OW_L$, $OW_S$ and one or more optical ring resonators that couple to the optical waveguides $OW_L$, $OW_S$. In each stage, the paired optical waveguides $OW_L$, $OW_S$ produce a relative phase difference between optical signals propagating there through. Between different stages, the optical ring resonators may have close resonant wavelengths, i.e., the resonant wavelengths of the optical ring resonators of the various stages may have a vernier-like relationship. For that reason, the sequence of stages may provide a spectral transmission characteristic with wider optical notch regions as in the optical filter 34D of FIG. 34D. Embodiments of such hybrid multi-stage Mach-Zehnder interferometers may be further described in U.S. Pat. No. 6,580,534.

Some embodiments of the optical filters optical $34_1$–$34_N$ of FIG. 3 include a wavelength-tunable version of the optical filter 34D, 34E of FIG. 4D or 4E. In such embodiments, the electronic controller 30 is configured to operate one or more heaters that can apply heat to thermally active portions of the optical resonant rings or is configured to operate one or more electrode pairs that can apply voltages across electro-optically active portions of the optical ring resonators. In either configuration, the electronic controller 30 can vary refractive indexes in the active portions of the optical ring resonators thereby varying the resonant wavelengths of the optical ring resonators themselves. In embodiments that include the hybrid Mach-Zehnder interferometer 34E, the electronic control 30 may also apply control signals to heaters that can apply heat or electrode pairs that can apply voltages across active segments, S, of the pairs of optical waveguides $OW_L$, $OW_S$. In each such pair of optical waveguides $OW_L$, $OW_S$, the active segments, S, have refractive indexes that respond to such control signals thereby changing the relative phase differences produced between the light that propagates through the pair. In such embodiments, the electronic control 30 may also be configured to apply control signals to heaters that can apply heat across active regions of optical couplers, OC, or may be configured to apply control signals to electrode pairs that can apply voltages across the active regions of the optical couplers, OC. Such control signals can vary the relative strengths of direct and crossed optical couplings between the optical waveguides $OW_L$, $OW_S$ of the stages adjacent such optical couplers, OC. In light of the above-description, one of skill would be able to implement such control structures to make embodiments of the optical filters 13D, 13E that have wavelength-tunable band passes and/or band notches.

In some embodiments, the individual optical filters $34_1$–$34_N$ of FIG. 3 may include serial cascades of component optical filters. The component optical filters may have the designs illustrated in FIGS. 4A–4E or may have wavelength-tunable versions of said designs as already described. In such cascades, different component optical filters can be configured to block different ones of the individual wavelength-channels output to the cascades by the corresponding OOs of the N×N OXC matrix 26. That is, such cascades can be configured to serially filter out the undesired wavelength-channels. For example, the optical filter $34_k$ may be a cascade of a first component optical filter having a transmission notch for wavelength-channel k, a second component optical filter having a transmission notch for wavelength-channel k+2N, and a third component optical filter having a transmission notch for wavelength-channel k+3N. In such an embodiment, the optical filter $34_k$ would only pass optical signals on wavelength-channel k+N in response to receiving optical signals on wavelength-channels k, k+N, k+2N, and k+3N from the N×N OXC matrix 26.

Figure 5:
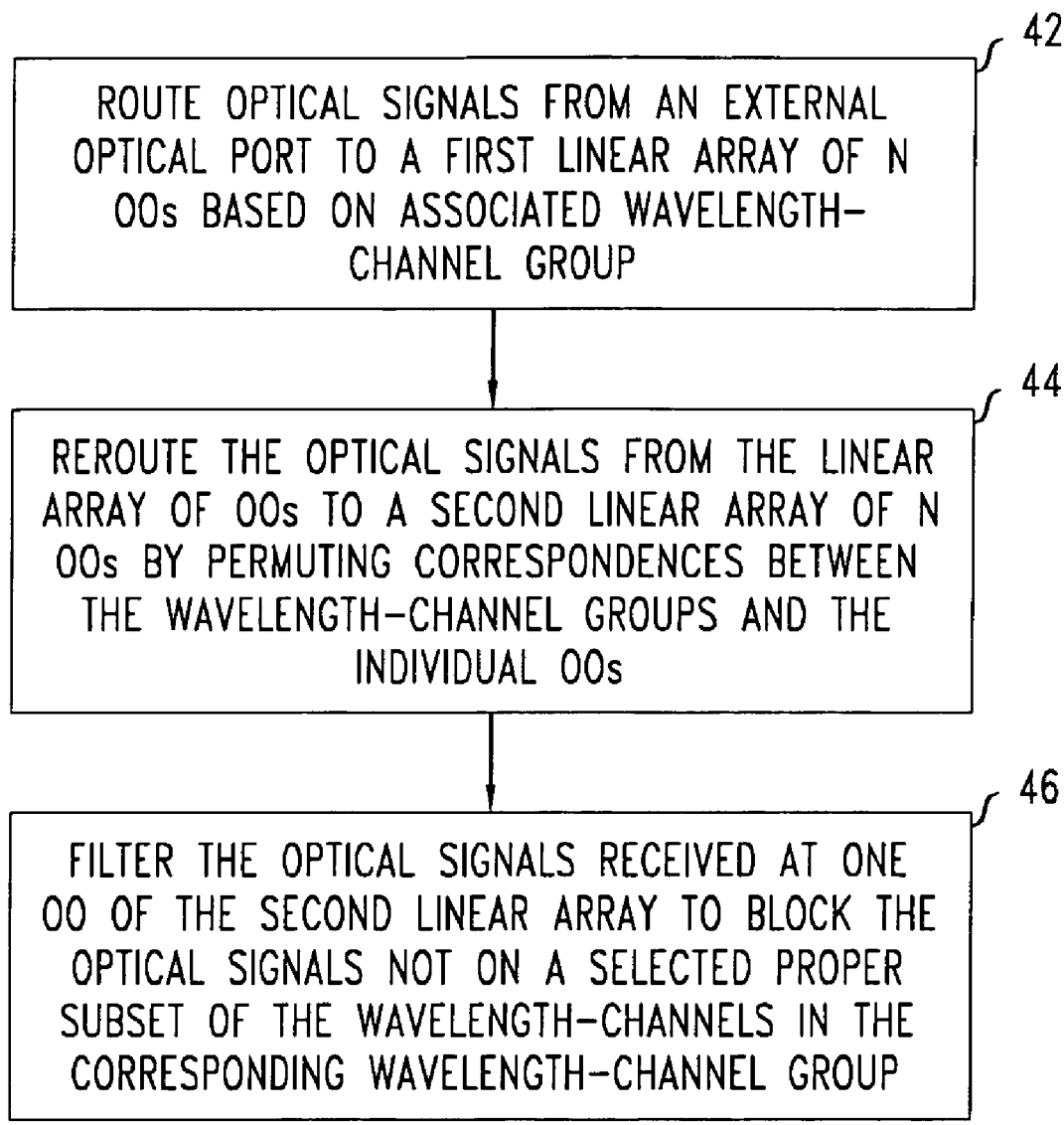
FIG. 5 is a flow chart illustrating a method of operating an optical add/drop module, e.g., the optical add/drop modules of FIGS. 2 and 3.

FIG. 5 illustrates a method 40 for operating an all-optical add/drop module that connects a first external optical port to N second external optical ports, e.g., the optical add/drop module 22 of FIG. 2 or the optical add/drop module 32 of FIG. 3.

The method 40 includes routing received optical signals from the first external optical port into a first linear array of N OOs thereby spatially repartitioning the optical signals between the different OOs based on their associated wavelength-channel group (step 44). In particular, the routing step transmits the optical signals of each wavelength-channel group to a corresponding OO of the spatial sequence of OOs that is located on or along a surface of a substrate. Each wavelength-channel group may contain one, two, or more wavelength-channels. The optical DEMUX 24 may perform the routing step when each wavelength-channel group includes wavelength-channels that are spaced apart by N times the width of a single wavelength-channel.

The method 40 also includes rerouting the optical signals from the first linear array of OOs to a second linear array of N OOs, which is also located on or along the surface of the substrate (step 44). The rerouting step nontrivially permutes the correspondences between the wavelength-groups and the individual OOs of the linear arrays. In particular, the permuting spatially reorders the assignments of the wavelength-channel groups to an array of OOs that is linearly ordered along the same surface of the substrate. For example, the N×N OXC matrix 26 may perform such a permuting action by connecting its N OIs into its N OOs with a crossing spatial pattern of two-ended optical paths.

Optionally, the method 40 includes filtering those optical signals that are received at one or more of the individual OOs of the second linear array to remove the optical signals not belonging to proper subsets of the wavelength-channels of the group corresponding to the individual OOs (step 46). At the one or more OOs, the filtering step reduces the number of passed wavelength-channels. At each such OO, the filtering step may include blocking all optical signals except those on a single selected wavelength-channel corresponding to the OO even though optical signals on multiple wavelength-channels were delivered to the OO. The optical filters $34_1$–$34_N$ may perform, e.g., the filtering step so that each external port $14_1$–$14_N$ receives the optical signals on a smaller set of wavelength-channels, e.g., one such channel.

Figure 6:
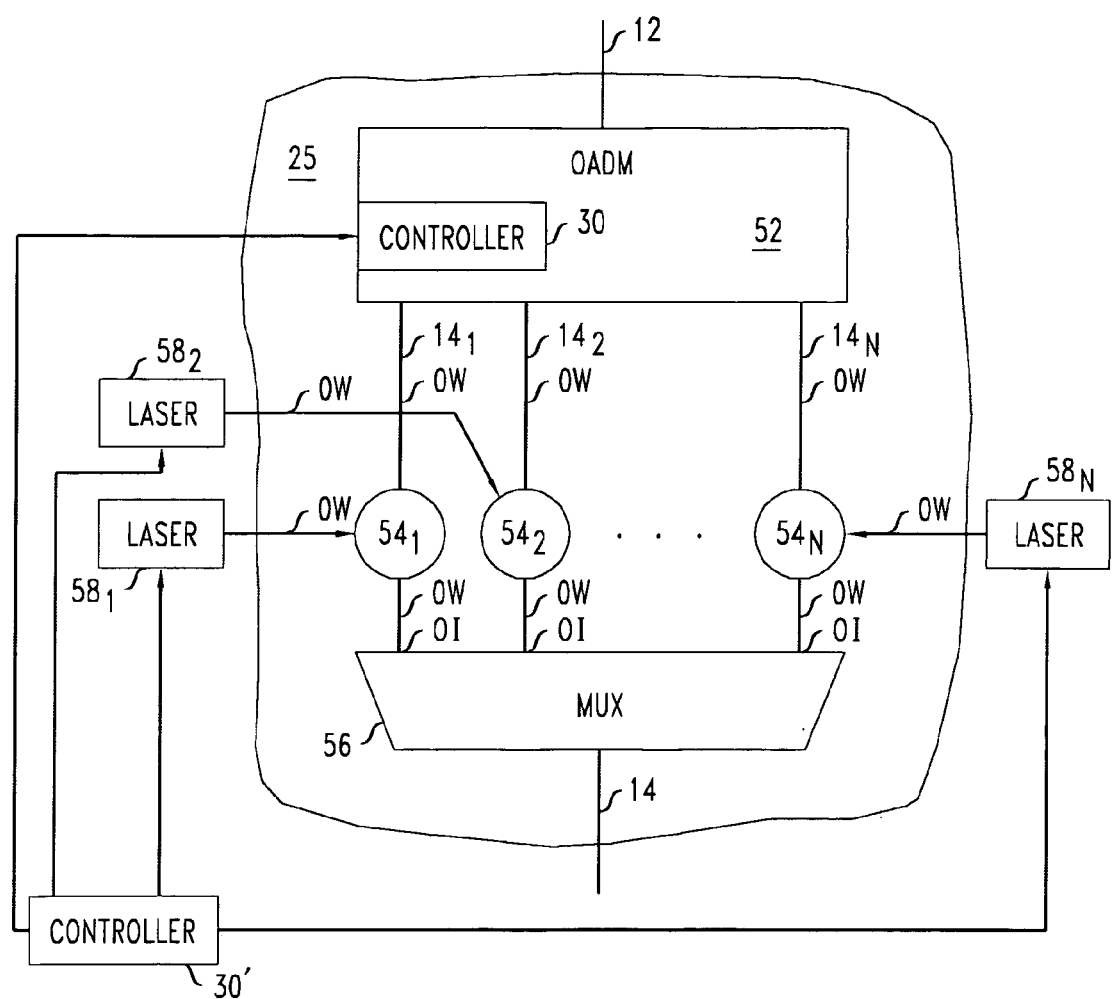
FIG. 6 is a block diagram for a multi-channel optical wavelength-converter that may include one of the optical add/drop modules of FIGS. 2 and 3.

FIG. 6 shows a multi-channel optical wavelength converter 50 that includes a tunable optical add/drop module (OADM) 52 with N+1 external optical ports, e.g., one of the optical add/drop modules 22, 32 shown in FIGS. 2 and 3. The multi-channel optical wavelength converter 50 also includes N single-channel optical wavelength-converters $54_1, 54_2, \ldots, 34_N$ and an optical multiplexer (MUX) 56 with N OIs. Each single-channel optical wavelength-converter $54_1$–$54_N$ has an OI that connects to a corresponding one of the N external optical ports $14_1$–$14_N$ of the optical add/drop module 52 via an optical waveguide (OW). Each single-channel optical wavelength-converter $54_1$–$54_N$ has an OO that connects via another optical waveguide to a corresponding OI of the optical MUX 56. Each single-channel optical wavelength converter $54_1$–$54_N$ is pumped by a wavelength-tunable pump laser $58_1, 58_2, \ldots, 58_N$.

In the multi-channel optical wavelength converter 50, the optical add/drop module 52 routes optical signals of only one wavelength-channel to each external optical port $14_1$–$14_N$. For that reason, each of the single-channel optical wavelength-converters $54_1$–$54_N$ only wavelength-converts optical signals on a single wavelength-channel. The wavelength-conversions, e.g., permute the channel assignments for some of the independent data streams that are originally received at the external optical port 12.

In the multi-channel optical wavelength converter 50, the electronic controller 30 configures the optical add/drop module 52 to pre-compensate the spatial permutation of the wavelength-channels that will be caused by the wavelength-conversions in the single-channel optical wavelength-converters $54_1$–$54_N$. In particular, the pre-compensation ensures that the wavelength-converted optical signals will be transmitted to the proper OIs of the optical MUX 56 so that the optical MUX 56 routes the wavelength-converted optical signals to the external optical port 14. Indeed, the optical MUX 56 also functions as an optical band pass filter for the non-wavelength-converted light passing through the single-channel optical wavelength-converters $54_1$–$54_N$. Such non-wavelength-converted light is typically not routed to the external optical port 14 by the optical MUX 56.

In the multi-channel optical wavelength-converter 50, the single-channel optical wavelength-converters $54_1$–$54_N$ are pumped by the tunable lasers $58_1$–$58_N$. In particular, the tunable lasers $58_1$–$58_N$ generate pump light at the converted-wavelength, and the input streams of optical signals modulate the pump light to produce the wavelength-converted optical signals. The pump lasers $58_1$–$58_N$ are wavelength tunable, and a second electronic controller 30' sets the output wavelengths of the pump lasers $58_1$–$58_N$ and also controls the electronic controller 30 of the tunable OADM 52 during operation.

In the multi-channel optical wavelength-converter 50, the single-channel optical wavelength-converters $54_1$–$54_N$ may be, e.g., semiconductor optical amplifiers (SOAs). In a SOA, input optical signals amplitude modulate pump light at the converted-wavelength to produce the wavelength-converted optical signals. Such modulation is caused by nonlinear optical effects in the semiconductor of the SOA. The semiconductor may be a compound crystalline material that includes gallium (Ga), indium (In), arsenic (As), and/or phosphorus (P). For example, a SOA may be a layered InGaAsP structure that is fabricated on an InP substrate. The fabrication of SOAs for use as wavelength-converters is well-known to those of skill in the art.

The single-channel optical wavelength-converters $54_1$–$54_N$ may also be other types of single-channel optical wavelength converters known to those of skill in the art, e.g., lithium-niobate optical wavelength converters.

In the multi-channel optical wavelength converter 50, the optical MUX 56 may be, e.g., a planar AWG device. The construction of optical MUXes with AWGs is substantially similar to the construction of optical DEMUXes with planar AWGs and optical star couplers as has already been described. U.S. Pat. Nos. 5,002,350 and 5,136,671 describe AWG-based optical MUXes that may be suitable for the optical MUX 56.

Hybrid integration techniques that combine dielectric and semiconductor planar substrates may be capable of producing integrated planar semiconductor modules that include the optical DEMUXing, switching, filtering, wavelength converting, and MUXing components of the multi-channel optical wavelength-converter 50. Such hybrid integration techniques may produce modules with better overall performance while eliminating the need for costly optical connectors and fiber splices. The fabrication of the multi-channel optical wavelength-converter 50 may eventually be possible on a single planar InP substrate.

Figure 7:
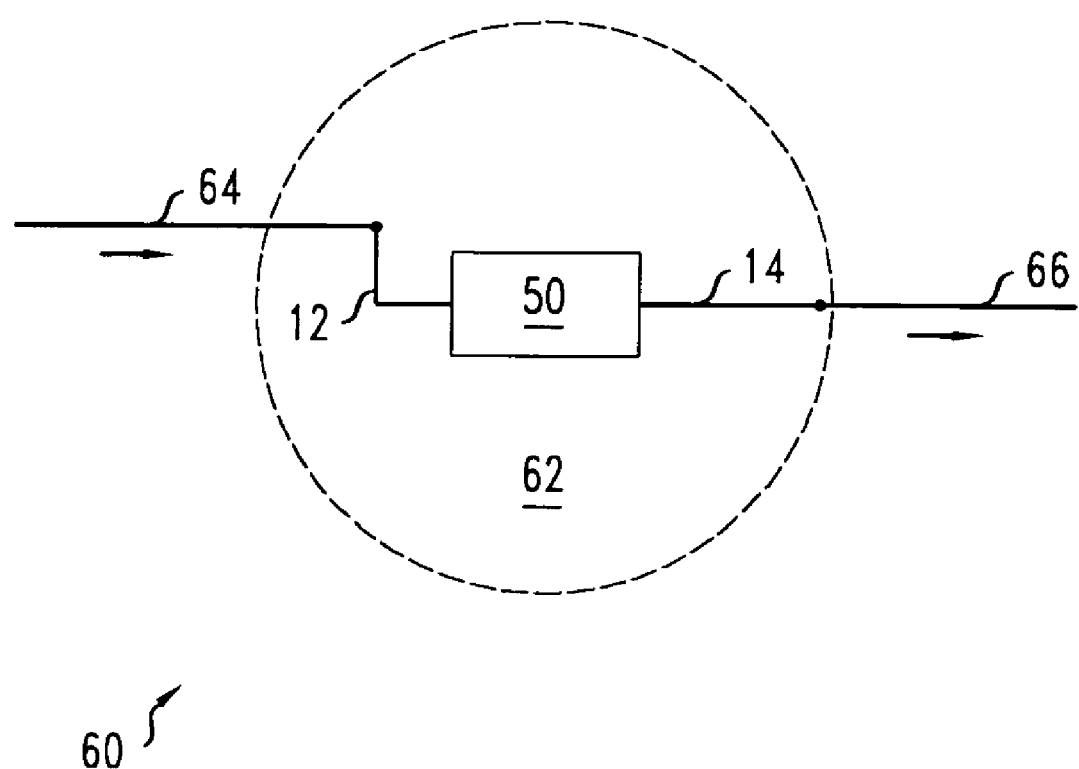
FIG. 7 is a block diagram illustrating a portion of an optical communication system that includes the multi-channel optical wavelength-converter of FIG. 6.

FIG. 7 illustrates a portion 60 of a DWDM optical communication system that includes a node 62, an input optical transmission fiber 64, an output optical transmission fiber 66, and the multi-channel optical wavelength-converter 50 of FIG. 6. In the node 62, the multi-channel optical wavelength-converter 50 end-connects the input optical transmission fiber 64 to the output optical transmission fiber 66. This all-optical connection can transfer to the output optical transmission fiber 66 the optical signals of the input optical transmission fiber 64 on a subset of the wavelength-channels used therein. In the output optical transmission fiber 66, the transferred optical signals can be transferred on the same or different wavelength-channels or on a combination of the same and different wavelength-channels as used in the input optical transmission fiber 64. At the node 62, the wavelength-conversion can change dynamically so that the above-described new wavelength-channel assignments are responsive to channel failures, channel congestion, and/or channel unavailabilities in the output optical transmission fiber 66. Finally, the cyclic operation of the optical add/drop module 52 of the multi-channel optical wavelength-converter 50 may enable optical signal transfers that use wavelength-conversions on many subsets of the set of wavelength-channels in the input optical transmission fiber 64.

Finally in the DWDM optical transmission system of FIG. 7, the node 62 can also use a parallel combination of more than one of the multi-channel optical wavelength-converters 50 to transfer optical signals on more wavelength-channels from the input optical transmission fiber 64 to the output optical transmission fiber 66.

Figure 8:
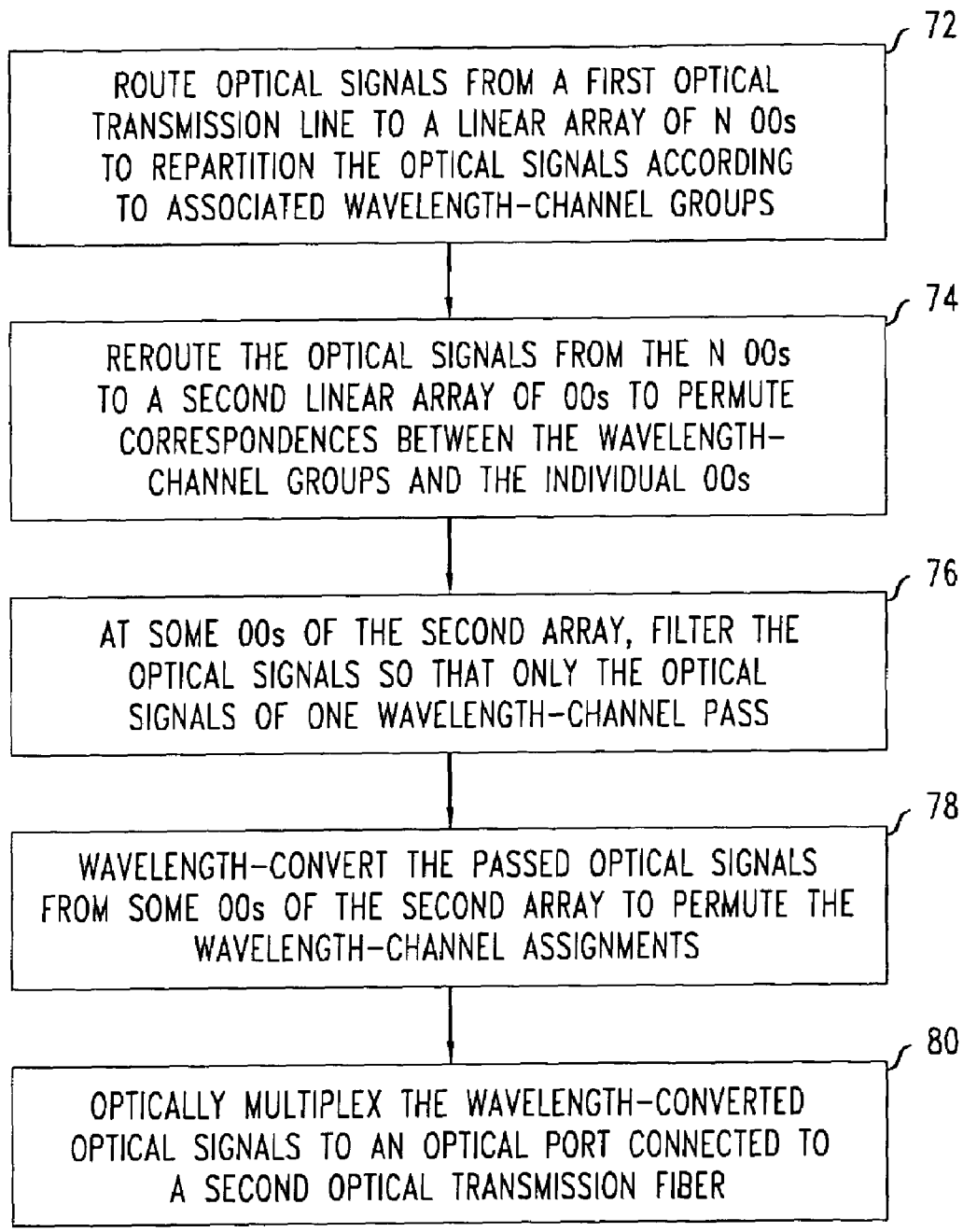
FIG. 8 is a flow chart for an all-optical method of connecting one optical transmission fiber and another optical transmission fiber in a multi-channel optical communication system, e.g., the optical communication system of FIG. 7.

FIG. 8 illustrates an all-optical method 70 for transferring optical signals between first and second optical transmission lines of a multi-channel optical communication system, e.g., between the transmission fibers 64 and 64 of the DWDM optical communication system of FIG. 7. The method 70 includes routing optical signals received from an output end of the first optical transmission line to a first linear array of N OOs to repartition the received optical signals according to their associated wavelength-channel groups (step 72). Each wavelength-channel group may include one or more of the wavelength channels that transport optical signals on the first optical transmission fiber. The method 70 includes rerouting the optical signals from the first linear array of OOs to a second linear array of N OOs to nontrivially permute correspondences between the wavelength-channel groups and sequentially ordered individual OOs (step 74). For some or all of the OOs of the second linear array, the method 70 includes filtering the optical signals transmitted from each such OO to block all except one of the wavelength-channels (step 76). The filtering passes optical signals on a different wavelength-channel for each such OO. The method 70 includes wavelength-converting the optical signals from some of the OOs of the second linear array to permute the wavelength-channel of those optical signals (step 78). The method 70 also includes optically multiplexing the wavelength-converted optical signals to an external optical port that connects to one end of the second optical transmission fiber (80).

From the disclosure, drawings, and claims, other embodiments of the invention will be apparent to those skilled in the art.

I claim:

1. An apparatus, comprising:
   a substrate having a planar surface;
   an optical demultiplexer having N optical outputs and being located along the surface;
   an optical cross-connect matrix having a first array of N optical input ports and a second array of N optical output ports and being located along the surface, each optical input port of the optical cross-connect matrix being optically connected to a corresponding one of the optical outputs of the optical demultiplexer; and
   wherein the optical output ports have a sequential ordering in the second array that is a nontrivial permutation of a sequential ordering of the corresponding optical input ports in the first array.

2. The apparatus of claim 1, wherein the optical cross-connect matrix is tunable to route light from one of the optical input ports to different ones of the optical output ports therein.

3. The apparatus of claim 1, further comprising a controller configured to transmit a plurality of control signals to the optical cross-connect matrix, the optical cross-connect matrix capable of changing the permutation in response to each control signal.

4. The apparatus of claim 1, further comprising an array of optical filters, each of the optical filters being connected to receive light from a corresponding one of the optical output ports of the optical cross-connect matrix.

5. The apparatus of claim 4, wherein the optical demultiplexer and optical cross-connect matrix are able to route optical signals on a plurality of wavelength-channels to each of the optical filters, and each of the optical filters is capable of being configured to selectively block a proper subset of the wavelength-channels routed thereto by the optical demultiplexer and optical cross-connect matrix.

6. The apparatus of claim 1, further comprising a plurality of optical wavelength converters, each of the optical wavelength-converters being connected to optically receive light via a corresponding one of the optical output ports of the optical cross-connect matrix.

7. The apparatus of claim 6, further comprising an optical multiplexer, each of the optical wavelength-converters having an optical output coupled to one optical input of the optical multiplexer.

8. An apparatus, comprising:
   an optical demultiplexer having an array of optical outputs;
   an optical cross-connect matrix having a first array of N optical input ports and a second array of N optical output ports, each optical input port of the optical cross-connect matrix being optically connected to a corresponding one of the optical outputs of the optical demultiplexer; and an array of optical filters, each optical filter having an optical input connected to a corresponding one of the optical output ports of the optical cross-connect matrix.

9. The apparatus of claim 8, wherein some of the optical filters can be reconfigured to vary spectral pass regions thereof.

10. The apparatus of claim 8, wherein the optical cross-connect matrix is capable of changing optical routings between its optical input ports and its optical output ports.

11. The apparatus of claim 10, wherein some of the optical filters can be reconfigured to vary spectral pass regions thereof.

12. The apparatus of claim 11, wherein both the optical demultiplexer and the optical cross-connect matrix are located on a single planar substrate.

13. The apparatus of 12, further comprising an array of optical wavelength-converters, each of the optical wavelength-converters being connected to optically receive light via a corresponding one of the optical output ports of the optical cross-connect matrix.

14. The apparatus of claim 13, further comprising an optical multiplexer having an array of optical inputs connected to optical outputs of the optical wavelength-converters.

15. The apparatus of claim 11, further comprising an electronic controller connected to the some of the optical filters and capable of reconfiguring spectral pass regions of the some of the filters.

16. The apparatus of claim 15, wherein the controller is connected to the optical cross-connect matrix and is capable of changing optical routings between the optical input ports and optical output ports of the optical cross-connect matrix.

17. A method of routing optical signals that are received on a plurality of wavelength-channels, comprising:

routing the received optical signals from an optical input port to an optical output port of a first spatial array of N optical outputs such that each one of the optical outputs of the first spatial array receives those of the optical signals on a group of the wavelength-channels, the group of wavelength channels being in correspondence with the one of the optical outputs;

routing the optical signals from each optical output of the first spatial array to a corresponding optical output of a second spatial array of optical outputs such that correspondences between the groups and the optical outputs in the second spatial array are a nontrivial permutation of the correspondences between the groups and the optical outputs in the first spatial array; and filtering the optical signals received at least one of the optical outputs of the second spatial array to pass optical signals on only a proper subset of the wavelength-channels corresponding to the at least one of the optical outputs.

18. The method of claim 17, further comprising:

wavelength-converting the optical signals from some of the optical outputs of the second spatial array to change wavelength-channels carrying optical signals received from the some of the optical outputs.

19. The method of claim 18, further comprising:

optically multiplexing the wavelength-converted optical signals from the some of the optical outputs of the second spatial array to route said multiplexed optical signals to a single optical output port.

20. The method of claim 17, further comprising routing other optical signals received from the optical outputs of the first spatial array to the optical outputs of the second spatial array in a manner that changes the permutation; and then, filtering the optical signals received at some particular optical outputs of the second spatial array to pass optical signals on another proper subset of the wavelength-channels corresponding to the each particular optical output.

* * * * *